United States Patent
Wang et al.

(10) Patent No.: US 9,258,485 B2
(45) Date of Patent: Feb. 9, 2016

(54) IMAGE SENSOR CROPPING IMAGES IN RESPONSE TO CROPPING COORDINATE FEEDBACK

(71) Applicant: OMNIVISION TECHNOLOGIES, INC., Santa Clara, CA (US)

(72) Inventors: Xiaoyong Wang, Santa Clara, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 32 days.

(21) Appl. No.: 14/223,023

(22) Filed: Mar. 24, 2014

(65) Prior Publication Data

US 2015/0271411 A1    Sep. 24, 2015

(51) Int. Cl.
*H04N 5/228* (2006.01)
*H04N 5/232* (2006.01)
*H04N 5/907* (2006.01)
*G06T 11/60* (2006.01)

(52) U.S. Cl.
CPC ............ *H04N 5/23267* (2013.01); *G06T 11/60* (2013.01); *H04N 5/23293* (2013.01); *H04N 5/907* (2013.01); *G06T 2207/10016* (2013.01); *G06T 2210/22* (2013.01)

(58) Field of Classification Search
CPC .............. H04N 5/23267; H04N 5/907; H04N 5/23293; H04N 5/23219; H04N 21/4223; H04N 21/44218; G06T 11/60; G06T 2210/22; G06T 2207/10016; G06T 2207/30196–2207/30201; G06K 9/00221–9/00389; G06F 17/30793; A61B 5/1176

USPC ......................................... 348/222.1; 382/118
See application file for complete search history.

(56) References Cited

U.S. PATENT DOCUMENTS

| | | | |
|---|---|---|---|
| 8,049,786 B2 | 11/2011 | Pan et al. | |
| 2009/0278958 A1* | 11/2009 | Bregman-Amitai et al. | ............ 348/231.99 |
| 2014/0293007 A1 | 10/2014 | Angot et al. | |

FOREIGN PATENT DOCUMENTS

| TW | 201237802 A | 9/2012 |
|---|---|---|
| TW | 201319722 A | 5/2013 |

OTHER PUBLICATIONS

TW Patent Application No. 103124830—Taiwanese Office Action, issued Jul. 22, 2015, with English Translation (21 pages).

* cited by examiner

*Primary Examiner* — Yogesh Aggarwal
(74) *Attorney, Agent, or Firm* — Blakely Sokoloff Taylor & Zafman LLP

(57) ABSTRACT

Reducing consumption of image sensor processor bandwidth includes capturing an image containing subject matter with an image sensor and cropping the image to generate a cropped image. Cropping the image is performed by the image sensor in response to coordinates received from an image sensor processor. The cropped image is sent from the image sensor to the image sensor processor and new coordinates based on a position of the subject matter in the cropped image are determined with the image sensor processor. The new coordinates are then sent to the image sensor.

19 Claims, 5 Drawing Sheets

IMAGE SENSOR CROPPING IMAGES IN RESPONSE TO CROPPING COORDINATE FEEDBACK

TECHNICAL FIELD

This disclosure relates generally to image sensors and in particular but not exclusively, relates to anti-shaking technologies.

BACKGROUND INFORMATION

Image stabilization is important to image sensor technologies because it enhances final image quality. Image sensor movement during image capture sometimes distorts final image(s) as a result of the subject matter in the captured frame(s) changing during exposure. In still cameras, movement during image acquisition is particularly problematic at slow shutter speeds or when using lenses with a long focal length. In video cameras, camera shake can cause a noticeable frame-to-frame wiggle in the recorded images. To combat this problem many physical and electronic methods have been employed. Examples of such methods include the use of mechanical camera stability equipment, microelectronic sensors/actuators, and hardware/software to electronically correct images. Sometimes, electronic image stabilization is performed by (1) taking a much larger image than needed during the exposure period, (2) sending the image to the image sensor processor, and (3) cropping the captured frames to a smaller size using the image sensor processor. By doing this, the image sensor will likely retain the intended image in its field of view during acquisition and will be able to crop out differences between each frame. However, sending such large images to the image sensor processor may result in wasted bandwidth usage since much of the image is ultimately removed. Hence, reducing the bandwidth load on the image sensor processor would be desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for image sensors cropping images in response to cropping coordinate feedback are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" or "one example" means that a particular feature, structure, or characteristic described in connection with the embodiment is included in at least one embodiment of the present invention. Thus, the appearances of the phrases "in one embodiment" or "in an embodiment" or "one example" in various places throughout this specification are not necessarily all referring to the same embodiment. Furthermore, the particular features, structures, or characteristics may be combined in any suitable manner in one or more embodiments.

Figure 1:
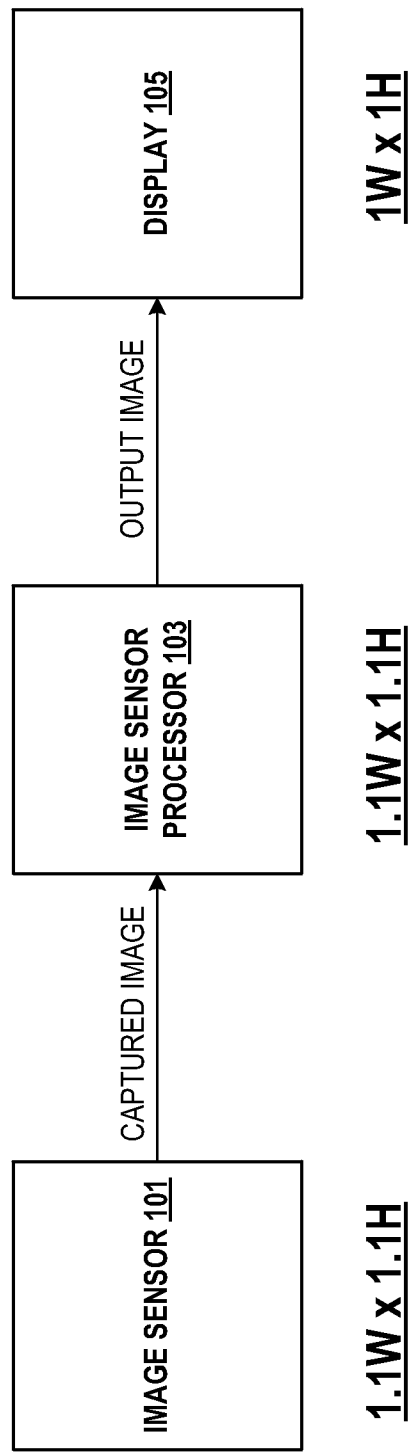
FIG. 1 is a block diagram illustrating an imaging system including an image sensor and image sensor processor.

FIG. 1 is a block diagram illustrating an imaging system 100 including an image sensor 101, image sensor processor 103, and a display 105. During operation, image sensor 101 captures an image that is larger than an output image that is output to display 105. Image sensor 101 then sends the captured image to image sensor processor 103. Image sensor processor 103 crops the captured image to generate a smaller output image according to an image stabilization algorithm. The output image is then sent to display 105. Although imaging system 100 facilitates image stabilization, it rapidly consumes image sensor processor 103 bandwidth. FIG. 1 includes "1.1W×1.1H" and "1W×1H" labels to note the size of the images in some conventional imaging systems when they are at image sensor 101, image sensor processor 103, and display 105, respectively.

Figure 2:
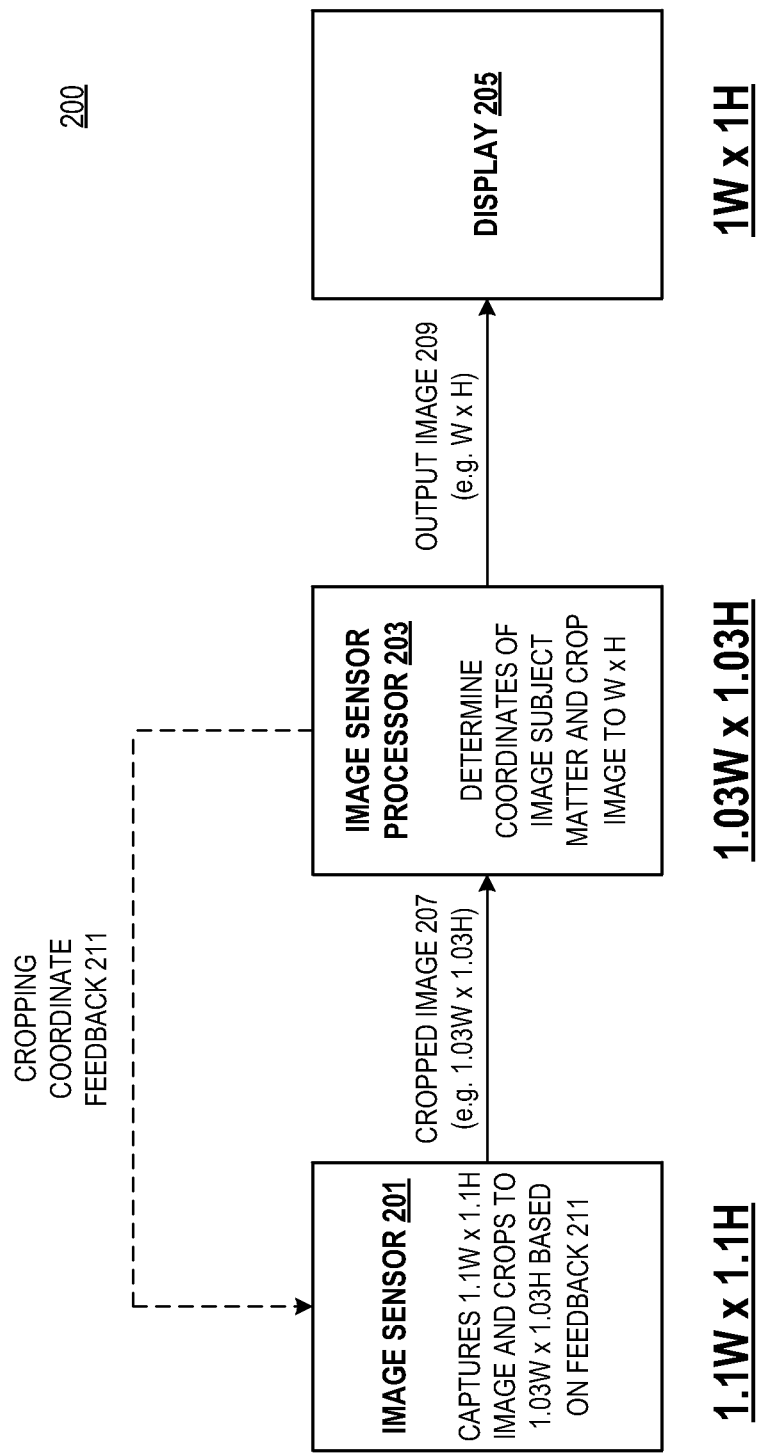
FIG. 2 is a block diagram illustrating an imaging system including an image sensor coupled to receive cropping coordinate feedback from an image sensor processor, in accordance with an embodiment of the disclosure.

FIG. 2 is a block diagram illustrating imaging system 200 including an image sensor 201 coupled to receive cropping coordinate feedback 211 from an image sensor processor 203, in accordance with an embodiment of the disclosure. Imaging system 200 may further include display 205. Imaging system 200 includes image sensor 201 to capture an image containing subject matter. Image sensor 201 is configured to crop the image to generate a cropped image 207 in response to receiving previous coordinates (cropping coordinate feedback 211) of the subject matter. Cropped image 207 may be 1.03W× 1.03H of the image captured by image sensor 201. Image sensor processor 203 is coupled to receive cropped image 207 from image sensor 201 and configured to determine coordinates of cropped image 207 based on a position of the subject matter in cropped image 207. In one example, subject matter in cropped image 207 may include a landscape, animal, person, and/or object. Image sensor processor 203 is coupled to send the coordinates (cropping coordinate feedback 211) of the subject matter to image sensor 201, and configured to crop cropped image 207 to generate output image 209 in response to the coordinates. Output image 209 may be 1.0W×1.00H of the image captured by image sensor 201. This configuration of imaging system 200 facilitates image stabilization by cropping the captured image to include the relevant subject matter in output image 209.

By cropping the image with image sensor 201, and then sending cropped image 207 from image sensor 201 to image sensor processor 203, a reduction in image sensor processor 203 bandwidth usage is achieved along with mitigation of image shake. Reduction of bandwidth usage may both conserve power and allow image sensor processor 203 to handle larger images. In one embodiment, image sensor 201 captures an image that is 1.1 times the width and 1.1 times the height of output image 209. In the same or another embodiment, cropped image 207 is 1.03 times the width and 1.03 times the height of output image 209. This image size reduction prior to sending cropped image 207 to image sensor processor 203, may result in a decrease of image sensor processor 203 bandwidth usage by ~15%.

In one embodiment, determining the coordinates of cropped image 207 may include analyzing movement between cropped image 207 and a previously cropped image. Analyzing movement between cropped image 207 and the previously cropped image may include determining local movement between cropped image 207 and the previously cropped image. The previously cropped image may be cropped from a previous image that was captured by image sensor 201 immediately preceding the capture of the image. Analyzing movement between cropped image 207 and the previously cropped image may also include determining global movement between cropped image 207 and the previously cropped image, wherein the previously cropped image was cropped from a previous image that was a first image captured by image sensor 201 in a series of images that includes the image and the previous image.

In one embodiment, an electrical output may be coupled to receive output image 209 from image sensor processor 203. In one example, the electrical output includes display 205. In another example, the electrical output includes non-volatile memory.

Figure 3:
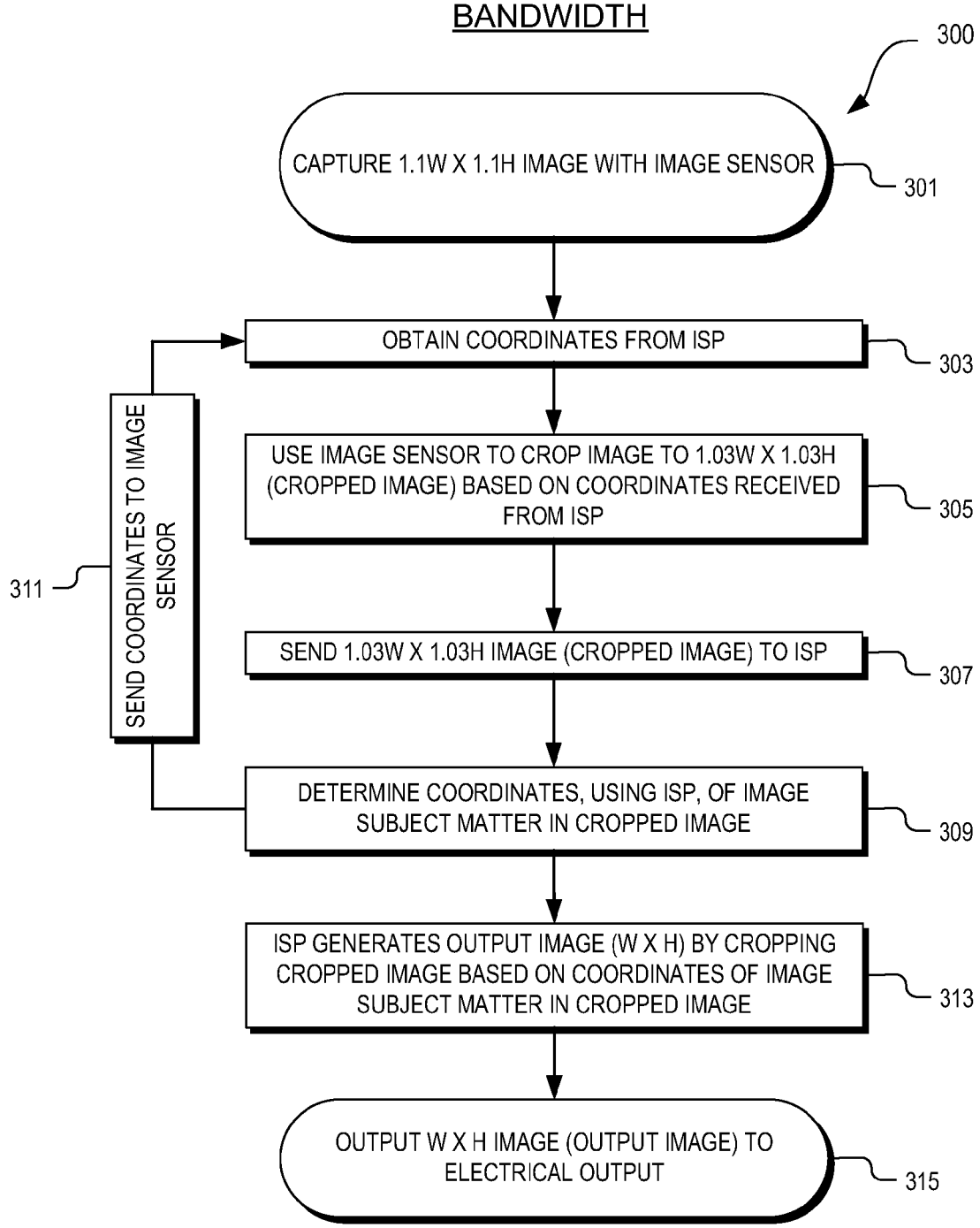
FIG. 3 illustrates a flow chart showing a method for reducing consumption of image sensor processor bandwidth, in accordance with an embodiment of the disclosure.

FIG. 3 illustrates a flow chart 300 showing a method for reducing consumption of image sensor processor bandwidth, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In process block 301, an image containing subject matter is captured with an image sensor (e.g. image sensor 201). In one embodiment, capturing the image includes capturing an image that is 1.1 times the width and 1.1 times the height of the output image.

In process block 303, the image sensor receives coordinates from the image sensor processor. In process block 305, the image is cropped by the image sensor (e.g. image sensor 201) to generate a cropped image (e.g. cropped image 207). Cropping the image is performed by the image sensor in response to the coordinates received from image sensor processor in process block 303. In one embodiment, cropping the image to generate a cropped image includes cropping raw image data. In the same or another embodiment, cropping the image to generate a cropped image includes cropping the image to a size that is 1.03 times the width and 1.03 times the height of the output image.

The cropped image is sent from the image sensor (e.g. image sensor 201) to the image sensor processor (e.g. image sensor processor 203), in process block 307. In one embodiment, a 15% bandwidth usage reduction may be achieved by sending the image sensor processor an image smaller than 1.1 times the width and 1.1 times the height of the output image.

In process block 309, new coordinates based on a position of the subject matter in the cropped image are determined using the image sensor processor (e.g. image sensor processor 203). Determining the new coordinates based on the position of the subject matter may include determining the new coordinates based on movement between the cropped image and a previously cropped image that was cropped by the image sensor processor prior to cropping the cropped image. In one embodiment, determining new coordinates based on movement between the cropped image and the previously cropped image includes determining local movement between the cropped image and the previously cropped image, wherein the previously cropped image was cropped from a previous image that was captured by the image sensor immediately preceding the capture of the image. In another embodiment, determining new coordinates based on movement between the cropped image and the previously cropped image includes determining global movement between the cropped image and the previously cropped image, wherein the previously cropped image was cropped from a previous image that was a first image captured by the image sensor in a series of images that includes the image and the previous image.

Process block 311 shows that the new coordinates are sent to the image sensor (e.g. image sensor 201). In process block 313, the cropped image is cropped to generate an output image. Cropping the cropped image is performed by the image sensor processor in response to the new coordinates. Process block 315 shows that the output image may be output. In one embodiment, the output image is output to a display. In another embodiment, the output image is output to non-volatile memory.

It is worth noting that the steps illustrated in flow chart 300 may repeat themselves an indeterminate number of times. In one embodiment, capturing a subsequent image containing the subject matter with the image sensor and cropping the subsequent image to generate a subsequent cropped image may occur. Additionally, cropping the subsequent image may be performed by the image sensor in response to the new coordinates received from the image sensor processor.

Figure 4:
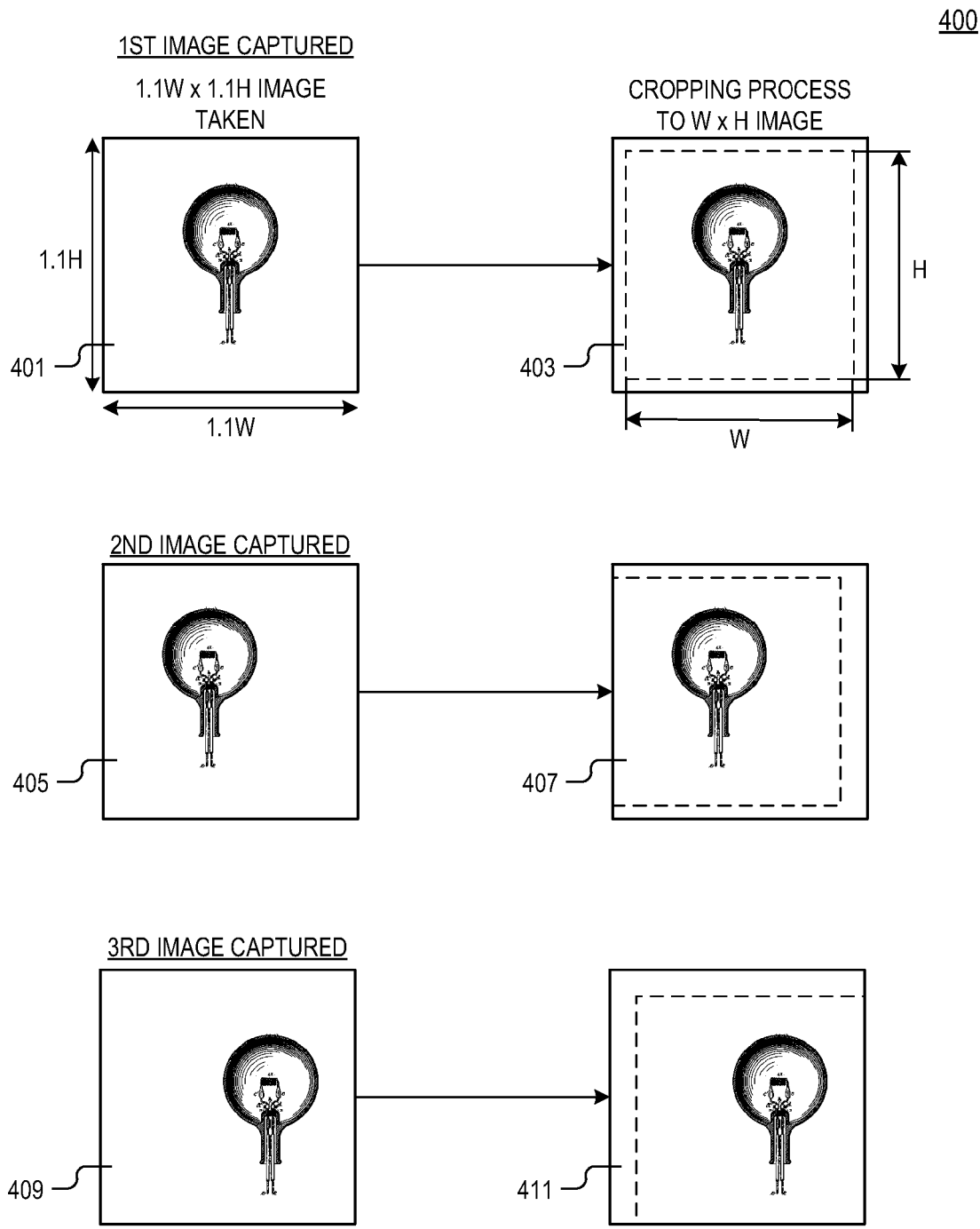
FIG. 4 is a diagram illustrating a cropping process performed by the imaging system in FIG. 1.

FIG. 4 is a diagram illustrating cropping process 400 performed by the imaging system 100 in FIG. 1. Several steps and multiple repetitions of cropping process 400 are shown. First image 401 is captured with an image sensor (e.g. image sensor 101). First image 401 is larger than the image that is output (e.g. to display 105). Then, first image 401 is sent to an image sensor processor (e.g. image sensor processor 103) where cropping coordinates are determined based on an image stabilization algorithm that analyzes subject matter in the first image. The image sensor processor crops first image 401 to generate a smaller first output image 403. Smaller first output image 403 is then sent to an electrical output (e.g. display 105).

Next, second image 405 is captured. Second image 405 is larger than the image that is output (e.g. to display 105). Then, second image 405 is sent to an image sensor processor (e.g. image sensor processor 103) where cropping coordinates are determined based on an image stabilization algorithm that analyzes subject matter in the second image. The image sensor processor crops second image 405 to generate a smaller second output image 407. Smaller second output image 407 is then sent to an electrical output (e.g. display 105). These steps repeat themselves until the final image or video is achieved. In FIG. 4 these steps repeat themselves a third time, wherein third image 409 is captured by the image sensor, transferred to the image sensor processor and cropped to smaller third output image 411.

By sending a larger captured image (e.g. image 401, 405, or 409) to the image sensor processor, image sensor processor bandwidth is quickly consumed. Therefore it is preferable to transfer a smaller image from the image sensor to the image sensor processor to limit the work of the image sensor processor while ultimately still achieving the same anti-shaking functionality.

Figure 5:
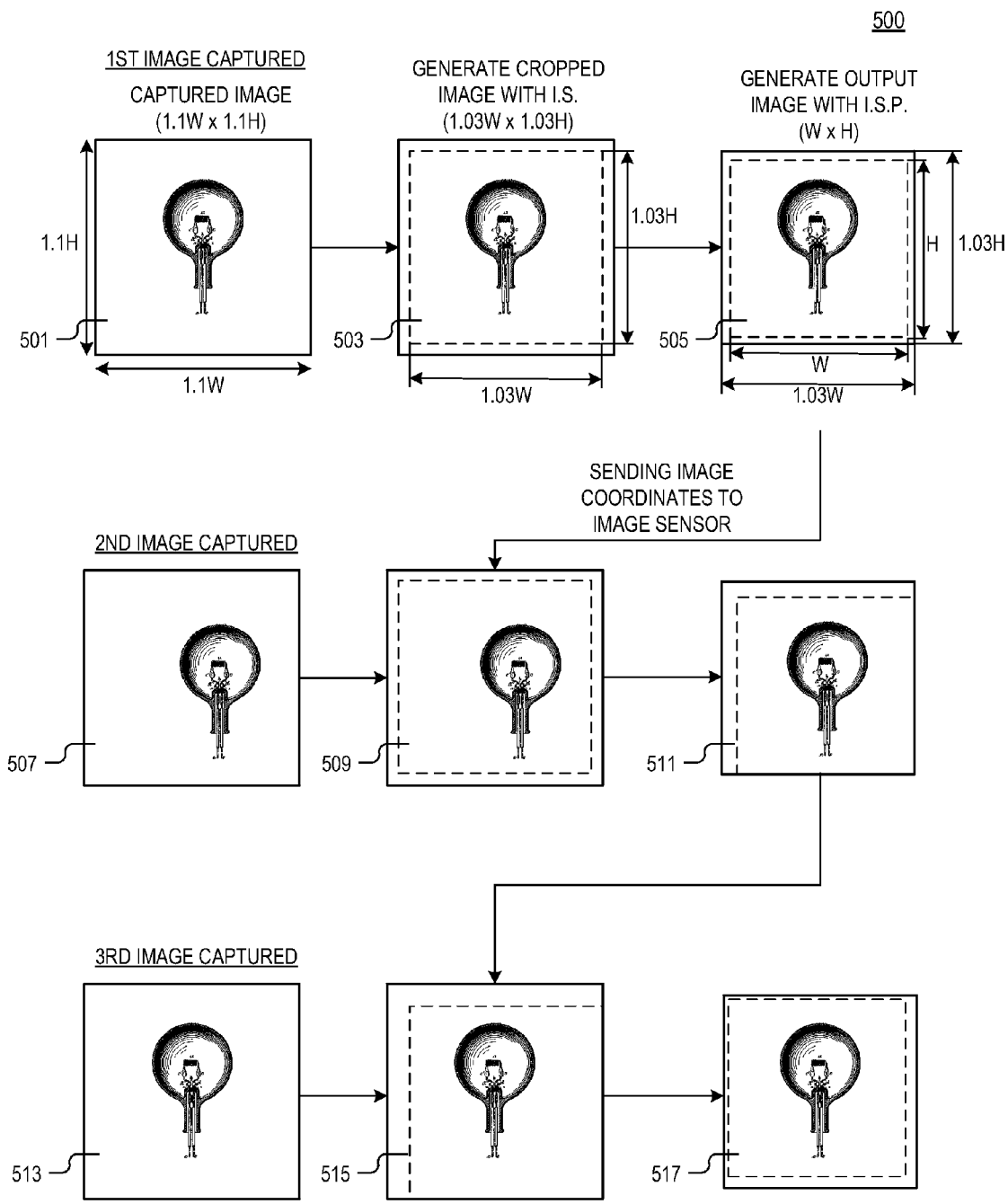
FIG. 5 is a diagram illustrating a cropping process associated with the imaging system illustrated in FIG. 2, in accordance with an embodiment of the disclosure.

FIG. 5 is a diagram illustrating cropping process 500 associated with imaging system 200 illustrated in FIG. 2, in accordance with an embodiment of the disclosure. Several steps and multiple repetitions of cropping process 500 are shown. A first image 501 is captured with an image sensor (e.g. image sensor 201). In one embodiment, first image 501 is 1.1 times the height and 1.1 times the width (1.1W×1.1H) of output image 505. The image sensor (e.g. image sensor 201) is configured to crop first image 501 to generate a first cropped image 503 in response to receiving previous coordinates (e.g. cropping coordinate feedback 211) of the subject matter. In FIG. 5, subject matter in first cropped image 503 consists of a light bulb. In one embodiment, first cropped image 503 is 1.03 times the width and 1.03 times the height of first output image 505. The image sensor processor (e.g. image sensor processor 203) is coupled to receive first cropped image 503 from the image sensor, and configured to determine first coordinates of first cropped image 503 based on a position of the subject matter (e.g. the light bulb) with first cropped image 503. The image sensor processor is coupled to send the first coordinates of the subject matter to the image sensor (e.g. cropping coordinate feedback 211), and configured to crop first cropped image 503 to generate first output image 505 in response to the first coordinates. Sending the coordinates of the subject matter to the image sensor allows for cropping process 500 to begin a new cycle. In one embodiment, an electrical output may be coupled to receive first output image 505 from the image sensor processor. In one example, the electrical output includes a display (e.g. display 205). In another example, the electrical output includes non-volatile memory.

Next, second image 507 is captured with an image sensor (e.g. image sensor 201). In one embodiment, second image 507 is 1.1W×1.1H of output image 511. The image sensor (e.g. image sensor 201) is configured to crop second image 507 to generate a second cropped image 509 in response to receiving first coordinates (e.g. cropping coordinate feedback 211) of the subject matter. In one embodiment, second cropped image 509 is 1.03 times the width and 1.03 times the height of second output image 511. The image sensor processor (e.g. image sensor processor 203) is coupled to receive second cropped image 509 from the image sensor, and configured to determine second coordinates of second cropped image 509 based on a position of the subject matter. The image sensor processor is coupled to send the second coordinates of the subject matter to the image sensor (e.g. cropping coordinate feedback 211), and configured to crop second cropped image 509 to generate second output image 511 in response to the second coordinates. In one embodiment, an electrical output may be coupled to receive second output image 511 from the image sensor processor.

The steps of cropping process 500 may repeat themselves indefinitely until the final image or video is achieved. In FIG. 5, these steps repeat themselves a third time, wherein third image 513 is captured by the image sensor, cropped by the image sensor to generate third cropped image 515, transferred to the image sensor processor and cropped to the W×H third output image 517.

In the embodiment depicted in FIG. 5, the subject matter (e.g. light bulb) is centered in image 501. This means that opposite edges of output image 505 are located equidistant from the edges of first image 501 that run parallel to the edges of first output image 505. Previous coordinates (e.g. cropping coordinate feedback 211) of the subject matter may be coordinates (with respect to pixels of image 501) of the lower left hand corner of first cropped image 503. In one embodiment, the location of the lower left hand corner of first cropped image 503 may be previous coordinates [20, 20] where the X and Y axis are represented by the bottom edge of image 501 and the left edge of image 501 respectively, and [0, 0] (X and Y intercept) is represented by the lower left hand corner of image 501. The image sensor (e.g. image sensor 201) is configured to crop first image 501 to generate first cropped image 503 in response to receiving previous coordinates [20, 20]. Cropping may occur by removing sections of image 501 that do not fit into the area of first cropped image 503, where location of first cropped image 503 is determined by the coordinates of first cropped image 503's lower left hand corner (e.g. [20, 20]). The image sensor processor (e.g. image sensor processor 203) is coupled to receive first cropped image 503 from the image sensor, and configured to determine first coordinates of first cropped image 503 based on a position of the subject matter (e.g. the position of the light bulb). In FIG. 5, since the subject matter (e.g. light bulb) remained in a centered position, the image sensor processor will determine that the first coordinates remain [20,20]. The image sensor processor will then send the first coordinates (e.g. cropping coordinate feedback 211) of the subject matter to the image sensor, and crop first cropped image 503 to generate first output image 505 in response to the first coordinates.

Second image 507 is then captured with an image sensor (e.g. image sensor 201). The image sensor is configured to crop second image 507 to generate second cropped image 509 in response to receiving first coordinates (e.g. cropping coordinate feedback 211) of the subject matter. In the depicted example, first coordinates are [20, 20]. Subsequently, the image sensor will crop second image 507 in the same way it cropped first image 501 and send the image sensor processor second cropped image 509. The image sensor processor will determine second coordinates of second cropped image 509 based on a position of the subject matter (e.g. light bulb). Here, in second image 507, the position of the subject matter has shifted to the right and down. This means that the cropping location should be shifted to the right and down. Accordingly, second coordinates may be coordinates [0, 40]. It should be noted that the subject matter (e.g. light bulb) is still contained in the second image. The image sensor processor will then send the second coordinates of the subject matter to the image sensor, and crop second cropped image 509 to generate second output image 511 in response to the second coordinates.

Lastly in FIG. 5, the image sensor will capture third image 513. The image sensor will crop third image 513 in response to receiving second coordinates of the subject matter (e.g. [0, 40]) to generate third cropped image 515. Third cropped image 515 is then sent to the image sensor processor. The image sensor processor will determine third coordinates of third cropped image 515 based on a position of the subject matter (e.g. light bulb). Here, in third image 513, the position of the subject matter has shifted to the left and up. Accordingly, third coordinates may be [10, 30]. The image sensor processor will then send the third coordinates of the subject matter to the image sensor, and crop third cropped image 515 to generate third output image 517 in response to the third coordinates.

It has been observed that cropping process 500 is desirable because global movement (the difference between the first frame captured and the most recent frame captured) during a capture period is rarely more than 10% of output image size (e.g. output images 505, 511, or 517). Additionally, local movement (the difference between two frames in sequence) is rarely greater than 3% of output image size. By first cropping to a 1.03×1.03 image based on the coordinates of the subject matter in the last image captured, the subject matter will still be contained in the cropped image. Therefore the 1.03×1.03 image may be passed to the image sensor processor to conserve image sensor processor bandwidth while the subject matter of the image sensor is still contained in the cropped image.

In one embodiment the image sensor processor calculates cropping coordinates based on global movement and feeds these global movement cropping coordinates back to the image sensor. In one example, the image sensor processor passes to the image sensor coordinates of one corner of a 1.03W×1.03H frame used to crop a 1.1W×1.1H image (e.g. image 501, 507, or 513). In the same or another embodiment, the image sensor processor may first calculate the local movement between a second cropped image and a third cropped image and use the local movement to calculate the global movement of the third cropped image relative to the first cropped image. The global image movement may then be fed back for use by the image sensor. It should be noted that cropping coordinates may also be comprised of edge values of the frame used to crop a captured image (e.g. image 501, 507, or 513), and that the frame used to crop may be rectangular or other geometry.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for reducing consumption of image sensor processor bandwidth, the method comprising:
   capturing an image containing subject matter with an image sensor;
   cropping the image to generate a cropped image, wherein cropping the image is performed by the image sensor in response to coordinates received from an image sensor processor;
   sending the cropped image from the image sensor to the image sensor processor;
   determining, with the image sensor processor, new coordinates based on a position of the subject matter in the cropped image, wherein said determining the new coordinates based on the position of the subject matter comprises determining the new coordinates based on movement between the cropped image and a previously cropped image that was cropped by the image sensor processor prior to cropping the cropped image; and
   sending the new coordinates to the image sensor.

2. The method of claim 1, further comprising cropping the cropped image to generate an output image, wherein cropping the cropped image is performed by the image sensor processor in response to the new coordinates.

3. The method of claim 2, further comprising outputting the output image.

4. The method of claim 3, wherein outputting the output image includes outputting the output image to a display.

5. The method of claim 3, wherein outputting the output image includes outputting the output image to a non-volatile memory.

6. The method of claim 2, wherein capturing the image comprises capturing an image that is 1.1 times the width and 1.1 times the height of the output image.

7. The method of claim 2, wherein cropping the image to generate a cropped image comprises cropping the image to a size that is 1.03 times the width and 1.03 times the height of the output image.

8. The method of claim 1, wherein determining the new coordinates based on the movement between the cropped image and the previously cropped image comprises determining local movement between the cropped image and the previously cropped image, wherein the previously cropped image was cropped from a previous image that was captured by the image sensor immediately preceding the capturing of the image.

9. The method of claim 1, wherein determining the new coordinates based on the movement between the cropped image and the previously cropped image comprises determining global movement between the cropped image and the previously cropped image, wherein the previously cropped image was cropped from a previous image that was a first image captured by the image sensor in a series of images that includes the image and the previous image.

10. The method of claim 1, wherein cropping the image to generate a cropped image comprises cropping raw image data.

11. The method of claim 1, further comprising:
    capturing a subsequent image containing the subject matter with the image sensor; and
    cropping the subsequent image to generate a subsequent cropped image, wherein cropping the subsequent image is performed by the image sensor in response to the new coordinates received from the image sensor processor.

12. An imaging system comprising:
    an image sensor to capture an image containing subject matter, wherein the image sensor is configured to crop the image to generate a cropped image in response to receiving previous coordinates of the subject matter; and
    an image sensor processor coupled to receive the cropped image from the image sensor and configured to determine coordinates of the cropped image based on a position of the subject matter in the image, wherein the image sensor processor is coupled to send the coordinates of the subject matter to the image sensor, and configured to crop the cropped image to generate an output image in response to the coordinates, wherein determining the coordinates of the cropped image includes analyzing movement between the cropped image and a previously cropped image.

13. The imaging system of claim 12, wherein analyzing the movement between the cropped image and the previously cropped image comprises determining local movement between the cropped image and the previously cropped image, wherein the previously cropped image was cropped from a previous image that was captured by the image sensor immediately preceding the capture of the image.

14. The imaging system of claim 12, wherein analyzing movement between the cropped image and the previously cropped image comprises determining global movement between the cropped image and the previously cropped image, wherein the previously cropped image was cropped from a previous image that was a first image captured by the image sensor in a series of images that includes the image and the previous image.

15. The imaging system of claim 12, wherein the image sensor is configured to capture an image that is 1.1 times the width and 1.1 times the height of the output image.

16. The imaging system of claim 12, wherein the cropped image is 1.03 times the width and 1.03 times the height of the output image.

17. The imaging system of claim 12, further comprising an electrical output coupled to receive the output image from the image sensor processor.

18. The imaging system of claim 17, wherein the electrical output comprises a display.

19. The imaging system of claim 17, wherein the electrical output comprises non-volatile memory.

\* \* \* \* \*